(12) United States Patent
Daniell

(10) Patent No.: US 7,373,607 B2
(45) Date of Patent: May 13, 2008

(54) SYSTEM AND METHOD FOR FORWARDING FULL HEADER INFORMATION IN EMAIL MESSAGES

(75) Inventor: W. Todd Daniell, Kennesaw, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 828 days.

(21) Appl. No.: 10/453,751

(22) Filed: Jun. 3, 2003

(65) Prior Publication Data

US 2004/0051736 A1 Mar. 18, 2004

Related U.S. Application Data

(63) Continuation of application No. 10/327,417, filed on Dec. 20, 2002.

(60) Provisional application No. 60/411,336, filed on Sep. 17, 2002, provisional application No. 60/416,916, filed on Oct. 8, 2002, provisional application No. 60/419,613, filed on Oct. 17, 2002, provisional application No. 60/425,935, filed on Nov. 13, 2002, provisional application No. 60/426,437, filed on Nov. 14, 2002.

(51) Int. Cl.
*G06F 3/00* (2006.01)
*G06F 15/16* (2006.01)

(52) U.S. Cl. ...................... 715/752; 709/204

(58) Field of Classification Search ................ 715/752; 709/204
See application file for complete search history.

(56) References Cited

U.S. PATENT DOCUMENTS 5,539,530 A 7/1996 Reifman et al.
6,707,472 B1 * 3/2004 Grauman ................ 715/752
6,785,712 B1 * 8/2004 Hogan et al. ............ 709/206
6,823,368 B1 * 11/2004 Ullmann et al. ......... 709/206
2002/0126146 A1 * 9/2002 Burns et al. ............. 345/752
2002/0175939 A1 * 11/2002 Iwasa ..................... 345/752

OTHER PUBLICATIONS

Presentation by Paik, Eun Kyoung; Entitled: impp, simple, prim, iptel (CPL), sigtran (SCTP), on Apr. 22, 2002.
By J. Rosenbert; Entitled: A Component Model for SIMPLE, pp. 1-11.
By J. Oikarinen, D. Reed; Entitled: Internet Relay Chat Protocol; pp. 1-65.
Web Address: www.jabber.org; for: Jabber software Foundation, entitled: Open Instant Messaging Powered by XMPP; pp. 1-3.
By R. Osborne, S. Aggarwal, L. Wong, P. Beebee, M. Calsyn, L. Lippert; Entitled: RVP: A Presence and Instant Messaging Protocol; pp. 1-37.

(Continued)

*Primary Examiner*—Tadessse Hailu
*Assistant Examiner*—Ting Zhou
(74) *Attorney, Agent, or Firm*—Thomas, Kayden, Horstemeyer & Risley LLP

(57) ABSTRACT

Systems and methods for selectively forwarding full header information in email messages are presented. When, an email message is received by a user, and the user chooses to forward the received email message, an option is provided to the user to either include the full header information of the received email in the forwarded email, or to not include the full header information of the received email in the forwarded email.

13 Claims, 6 Drawing Sheets

OTHER PUBLICATIONS

By J. Rosenberg, H. Schulzrinne; Entitled: SIP Event Packages for Call Leg and Conference State; pp. 1-23.
Web Address: www.ceruleanstudios.com/trillian; pages included: Features Tour (1), Messaging Enhancements (2), Connect to 5 Mediums (2), Interface Overview (1), Features Tour (Screenshots Gallery—Contact List Window) (1) Features Tour (Screenshots Gallery—Sending Pictures) (1), Features Tour (Screenshots Gallery—Message Window) (1).

Comments on Information Disclosure Statement.

* cited by examiner

SYSTEM AND METHOD FOR FORWARDING FULL HEADER INFORMATION IN EMAIL MESSAGES

CROSS REFERENCE TO RELATED APPLICATIONS

This application is a continuation of U.S. patent application Ser. No. 10/327,417, filed on Dec. 20, 2002, which claims the benefit of U.S. provisional patent application Ser. Nos. 60/411,336, filed Sep. 17, 2002; 60/416,916, filed Oct. 8, 2002; 60/419,613, filed Oct. 17, 2002; and 60/426,437 filed Nov. 14, 2002.

This application also claims the benefit of U.S. provisional patent application Ser. Nos. 60/411,336, filed Sep. 17, 2002; 60/416,916, filed Oct. 8, 2002; 60/419,613, filed Oct. 17, 2002; and 60/425,935 filed Nov. 13, 2002. These provisional patent applications are incorporated herein by reference in their entireties.

Additionally, U.S. patent application Ser. No. 10/274,408, filed Oct. 18, 2002; Ser. No. 10/274,478, filed Oct. 18, 2002; and Ser. No. 10/274,405, filed Oct. 18, 2002, are also incorporated herein by reference in their entireties.

FIELD OF INVENTION

The present invention relates generally to communications and, more particularly, to email systems and methods.

BACKGROUND

In many email systems, when a user receives an email message, the user is provided an option that permits the user to read the received email message. Typically, if the user chooses to read the received email message, then the received email message is displayed to the user in an email read window. In many email systems, when a recipient receives an email message, much of the standard header information is generally hidden from the recipient. Thus, a recipient often only sees a sender's name and/or email address, a subject line, and names and/or email addresses of other recipients if, for example, the email message is courtesy copied (cc) to other recipients or sent to multiple recipients.

From the email read window, the user is usually provided a number of options including the option to delete the email message, reply to the email message, print the email message, or forward the email message to a third person. When the user chooses to forward the received email message to a third person, the full header information of the received email message is normally removed, and a truncated header is placed in the message. The truncated header typically includes the name and email address of the original sender of the message, the subject line, the date of forwarding, and the person forwarding the email. Thus, the truncated header removes much of the information that is originally present in the full header information (e.g., return path, intermediate hops, date, time, content class, content type, subject, object linking and embedding (OLE) protocols used, multi-purpose Internet mail extensions (MIME), date sent, message identifier (ID), attachments, thread topic, thread index, transport neutral encapsulated format (TNEF) information, thread index, sender name, sender email address, reply-to address, content-transfer-encoding information, date received, time received, recipient names, recipient email addresses, attachment type, file name of attachment, etc.). The truncation of much of the full header, therefore, simplifies the header information.

Unfortunately, the truncated header is insufficient for certain purposes, such as reporting email abuse or tracing email for security purposes. Thus, when a recipient of an email wishes to report email abuse or wishes to trace an email, a systems administrator or security personnel typically needs the full header information of the received email.

For these types of situations where the full header information is needed, different options for viewing the email message are selected until the full header information is visible. Once the full header information is visible, the user typically has no other option but to copy the full header information into a buffer, and manually paste the full header information into an email message to send to security personnel or a systems administrator.

The manual cutting and pasting of the full header information is an inconvenient process that is also prone to human error. There is, therefore, a need in the art to address this deficiency.

SUMMARY

The present invention provides systems and methods for forwarding full header information in email messages.

Briefly described, in architecture, one embodiment of the system comprises a user interface having an email message forwarding screen that provides a user-selectable option. The user-selectable option provides an option to include or not include full header information of a received email message in a forwarded email message.

One method includes the steps of receiving an email message having full header information, receiving an input to forward the received email message, and providing a user-selectable option in response to receiving the input to forward the received email message. The user-selectable option provides an option to include or not include the full header information of the received email message in the forwarded email message.

Other systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 1A:
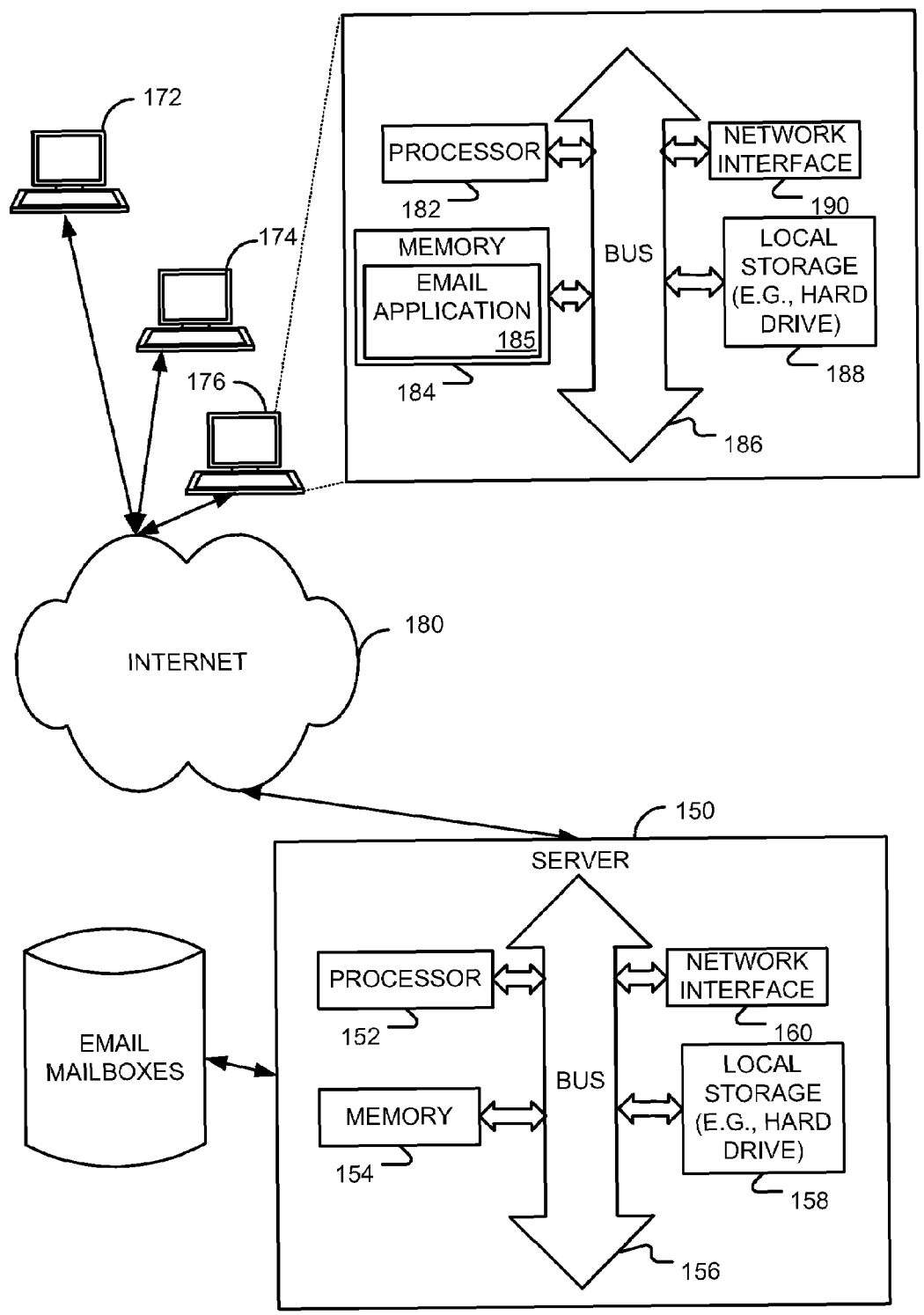
FIG. 1A is a block diagram showing a network with an email server and multiple user machines connected a network.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

FIG. 1A is a block diagram showing a server 150, an original sender workstation 172, a forwarding user workstation 174, and a forwardee recipient workstation 176 connected to a network 180. In general, the network 180 may be the Internet, a local area network (LAN), a wireless network, etc., which are known in the art.

In the operating environment shown in FIG. 1A, an original sender of an email message generates the email message at the original sender workstation 172 and sends the email message through a network 180 to a forwarding user at the forwarding user workstation 174. The forwarding user workstation 174 receives the email message from the original sender workstation 174 and forwards the email message to a forwardee recipient at the forwardee recipient workstation 176. The receiving and forwarding of email messages is described in greater detail below with reference to FIGS. 1B through 3.

As shown in FIG. 1A, the original sender workstation 172, the forwarding user workstation 174, and the forwardee recipient workstation 176 each includes a processor 182, a network interface 190, a memory 184, a local storage device 188, and a bus 186 that permits communication between the various components. In an example embodiment, the local storage device 188 may be a hard drive configured to electronically store data. The local storage device 188 may also store computer programs that execute on the workstations 172, 174, 176. In this sense, the processor 182 is configured to access any program that is stored on the local storage device 188, and execute the program with the assistance of the memory 184. In the embodiment of FIG. 1A, an email application 185 is shown as being loaded into memory 184 for launching at the workstation 172, 174, 176, thereby permitting the workstations 172, 174, 176 to send and receive email messages through the network 180. Since the functioning of computing devices is well known in the art, further discussion of the processor 182, the memory 184, and the local storage device 188 are omitted here.

The network interface 190 is configured to provide an interface between the original sender workstation 172, the forwarding user workstation 174, the forwardee recipient workstation 176, and the network. Thus, the network interface 190 provides the interface for each of the workstations 172, 174, 176 to receive any data that may be entering from the network and, also, to transmit any data from each of the workstations 172, 174, 176 to the network. Specifically, in one example embodiment, the network interface 190 is configured to permit communication between each of the workstations 172, 174, 176 and the server 150 and, additionally, to permit communication between the workstations 172, 174, 176 themselves. In this regard, the network interface 190 may be a modem, a network card, or any other interface that interfaces each of the workstations 172, 174, 176 to the network. Since various network interfaces are known in the art, further discussion of these components is omitted here. It should be understood that various aspects of the email application 185 may be conventional or may be custom tailored to specific needs.

The server 150 may also include a processor 152, a memory 154, a network interface 160, and a local hard drive 158, which are in communication with each other over a local bus 156. Since the components 152, 154, 156, 158, 160 at the server 150 perform largely similar functions as the components 182, 184, 186, 188, 190 at the workstations 172, 174, 176, further discussion of the server-side components is omitted here.

Figure 1B:
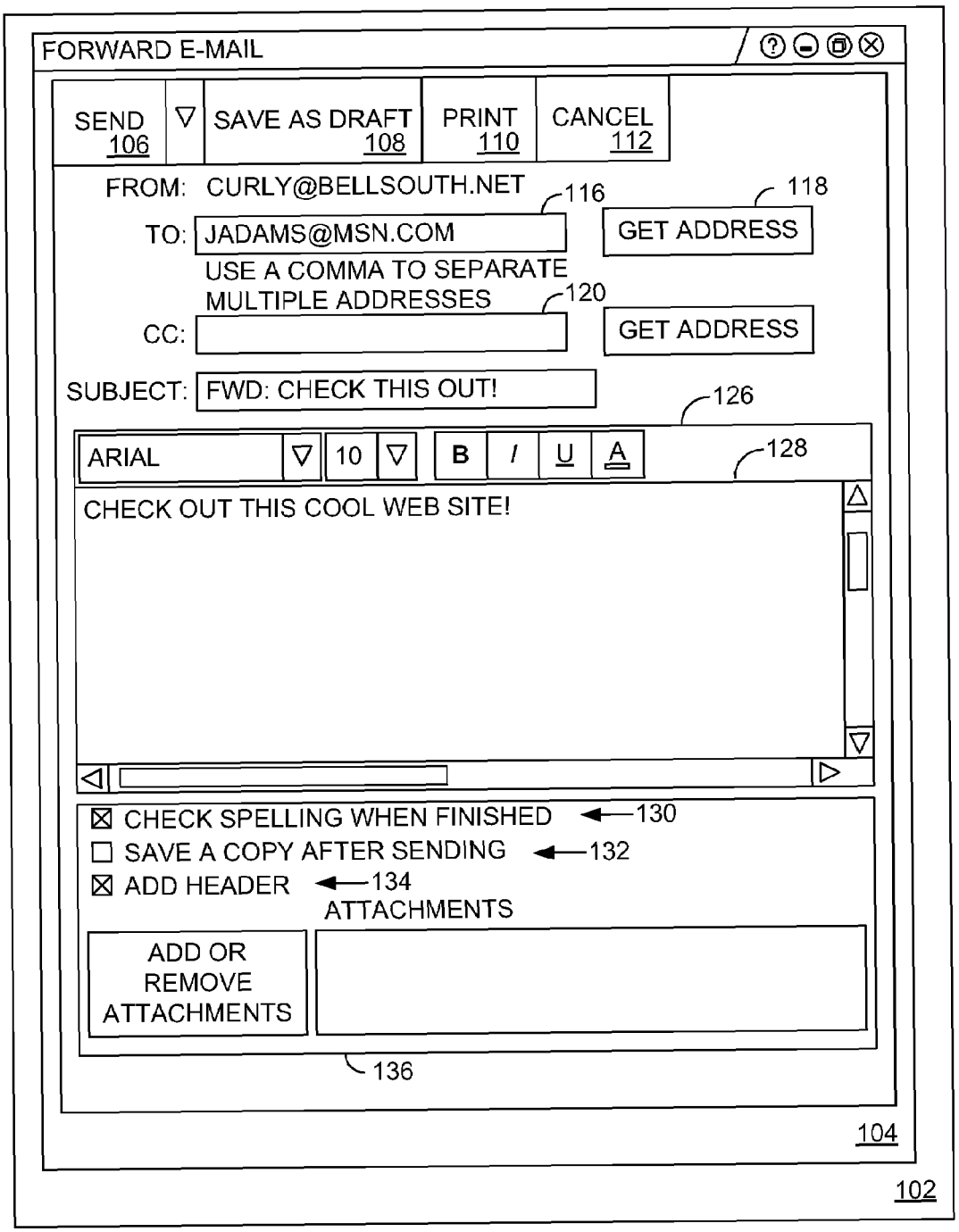
FIGS. 1B and 1C are diagrams showing a user interface having a user-selectable option for including or excluding full header information in a forwarded email.
Figure 1C:
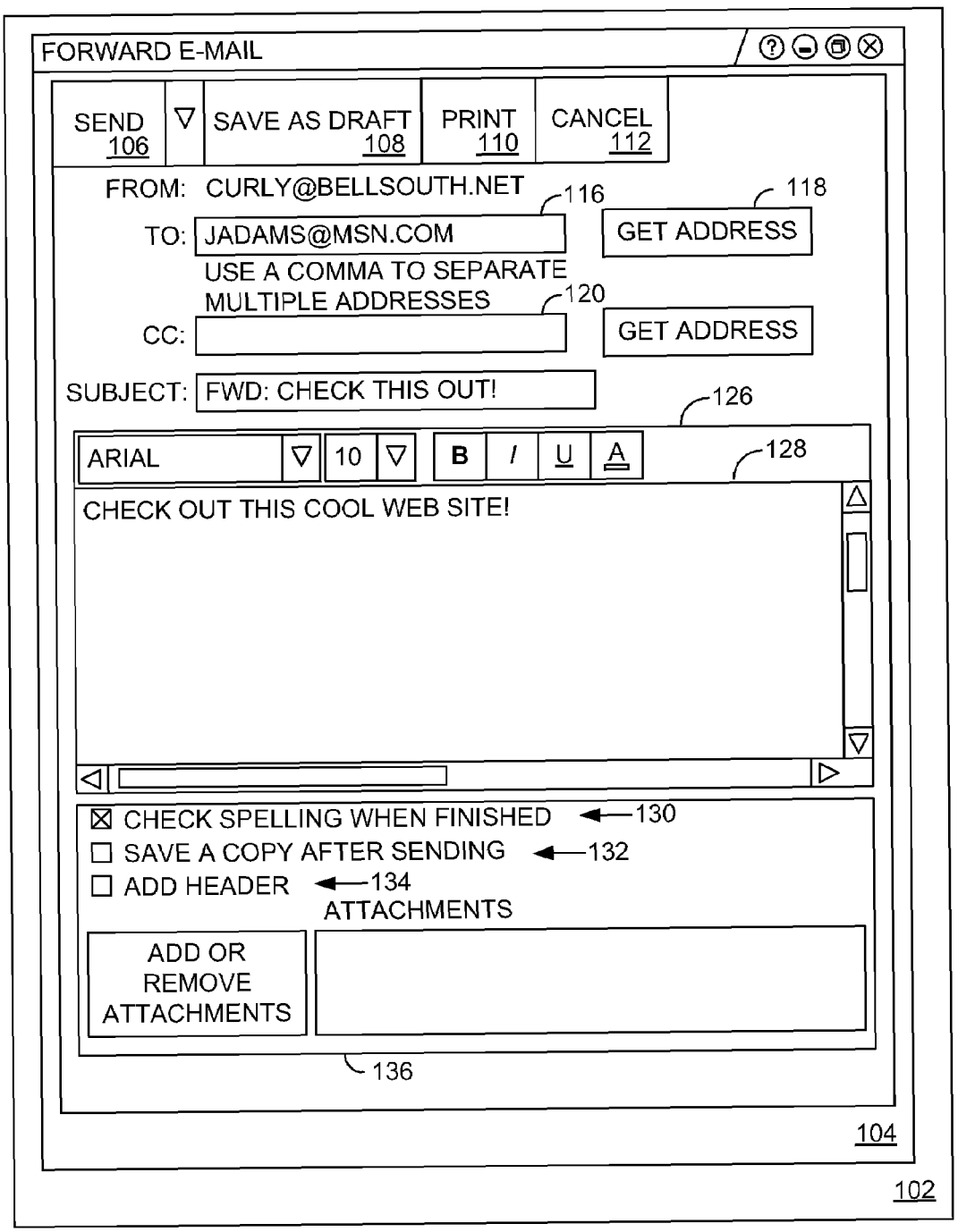

FIGS. 1B and 1C are diagrams showing a user interface 102 of a message-forwarding user, such as may be provided by an email application 185 upon receiving a user indication to forward an email message. The user interface 102 has a user-selectable check box 134 that provides a user-selectable option for including or excluding full header information in a forwarded email message. FIG. 1B shows the user interface 102 having the user-selectable check-box 134 selected by the user to include the full header information of the received email message in a forwarded email message. Conversely, FIG. 1C shows the user interface 102 having the user-selectable check-box 134 not selected by the user to not include the full header information of the received email message in the forwarded email message. It should be understood that other embodiments may include other mechanisms that prompt and/or enable a user to indicate a preference for including or not including full header information in a forwarded email message.

Upon receiving and/or opening an email message, a user may wish to forward the email message to security personnel or a systems administrator if the email message has offensive or other objectionable content (e.g., pornography, unsolicited bulk mail, virus, etc.). When the user chooses to forward the received email message, a user interface 102 having an email-forwarding window 104 is displayed to the user, in accordance with one embodiment, among others. As shown in FIG. 1B, the user interface 102 comprises a recipient email address input box 116 to which the user may enter a forwardee recipient's email address. In one embodiment, the user interface 102 further comprises an email address retrieval selection box 118 that, upon selection by the user, displays a list of previously-stored email addresses, such as from an address book or other contact list, so that the user may select one of the displayed email addresses as the forwardee recipient's email address. Since similar email address retrieval selection functions are known in the art, or would be understood by those reasonably skilled in the art based on the present disclosure, further discussion of the email address retrieval selection function is omitted here.

In addition to the email address input box 116, the user interface 102 comprises a subject line input box 120, which permits a user to edit a subject or title of an email message. Preferably, the client email application automatically provides a title based upon the original email with "FWD:" prepended. As shown in the specific example of FIG. 1B, the client application has titled the email message as "FWD: CHECK THIS OUT!"

Additionally, the user interface 102 may comprise a send button 106, a save button 108, a print button 110, and a cancel button 112. The send button 106 is a user-selectable selection box that is displayed at the user interface 102, which permits the user to send the email message to a forwardee recipient. Thus, when the user selects the send button 106, the email message on the user interface is forwarded (i.e., sent) to the forwardee recipient as designated in the email address input box 116. The save button 108 is a user-selectable selection box that is displayed at the user interface 102, which permits the user to save the email message. Thus, when the user selects the save button 108, the email message is saved to a file or folder. The print button 110 is a user-selectable selection box that is displayed at the user interface 102, which permits the user to print the email message. Thus, when the user selects the print button 110, the email message at the user interface 102 is printed to a local or network printer (not shown). The cancel button 112 is a user-selectable selection box that permits the user to cancel the forwarding of the email message. Thus, when the user selects the cancel button 112, the email-forwarding window 104 is closed. Since the save button 108, the send button 106, the print button 110, and the cancel button 112 are known in the art, further discussion of these various user items is omitted here.

The user interface 102 also comprises a text window 128 in which the user may enter additional text as part of the forwarded text message. Since the user interface 102 of FIG. 1B is configured for forwarding email messages, the text window 128 includes the text of the originally received message that is being forwarded by the user. Additionally, the user interface 102 may comprise an option bar 126, which permits the user to alter the font of the message in the text window 128. Also, an attachments item 136 may be present on the user interface 102, thereby permitting the user to attach various files to the email message, in addition to any attachments that may be automatically attached to the forwarded email message by virtue of being attached to the original email message. In addition to the text window 128, the option bar 126, and the attachments item 136, the user interface 102 may further comprise a spell-check item 130 and a save copy item 132, which are user-selectable items that toggle on and off depending on whether the user chooses to check spelling or save a copy of the forwarded email message. Since the text window 128, the option bar 126, and the attachments item 136, the spell-check item 130, and the save copy item 132 are well known in the art, further discussion of these items is omitted here.

Unlike prior user interfaces for forwarding email messages, the user interface 102 of FIG. 1B also comprises the user-selectable check-box 134 on the email forwarding screen 104, which provides the user the option of including full header information of the received email message in the forwarded message, or the option of not including full header information of the received email message in the forwarded message. In one embodiment, the user-selectable check-box 134 is configured to toggle between a designation indicating inclusion of the full header information and a designation indicating omission of the full header information. In this regard, if the user selects the check-box (e.g., clicks on the check-box using a mouse), then the check-box may toggle "on" to indicate that the full header information of the received email message will be included in the message text of the forwarded email message itself. If the user again selects the check-box (e.g., clicks on the check-box a second time using the mouse), then the check-box may toggle "off" to indicate that the full header information of the received email message will not be included in the forwarded email message. In an example embodiment, the check-box may be checked on or off depending on whether or not the user wishes to include the full header information of the received email message in the forwarded email message. As shown in FIG. 1B, the user has selected the user-selectable option 134, thereby indicating that the full header information of the received email message is to be included in the forwarded email message.

In the embodiment of FIG. 1B, even though the forwarding user has selected the user-selectable option 134, the full email header is still not displayed to the forwarding user in the text window 128. Thus, in the embodiment of FIG. 1B, when the forwarding user is forwarding the received email message with the full header information of the received email message, the full header information is still not displayed to that user forwarding the email message. This provides a cleaner text window 128 for the forwarding user so that the forwarding user may include other text messages to the forwardee recipient of the forwarded email. However, it should be understood that other embodiments may display the full header information in the text window 128 upon selection of the check-box 134.

FIG. 1C shows the user interface 102 of FIG. 1B with the user-selectable option 134 not being selected by the forwarding user. Thus, as shown in FIG. 1C, the message-forwarding screen 104 indicates that the forwarding user has not chosen to include the full header information of the received email message in the forwarded email message. As a consequence of not selecting the check-box 134, the email message will be forwarded without the full header information.

As described above, in some conventional email systems, the full header information of the received email message is available to be seen by the forwarding user. However, some conventional email systems substitute the full email header information with a truncated header. The user-selectable option of FIGS. 1B and 1C, however, preferably prohibits the email system from removing or truncating the full header information, depending on the setting of the user-selectable check-box 134. In this regard, one embodiment of the system comprises functionality in the email software that determines whether or not the user has selected the option to include the full header information of the received email message in the forwarded email message. Additionally, the email software is configured to include the full header information of the received email message in the forwarded email message if it is determined that the user has selected the option to include the full header information. Similarly, the email software is preferably configured to not include the full header information of the received email message in the forwarded email message if it is determined that the user has not selected the option to include the full header information.

Figure 2A:
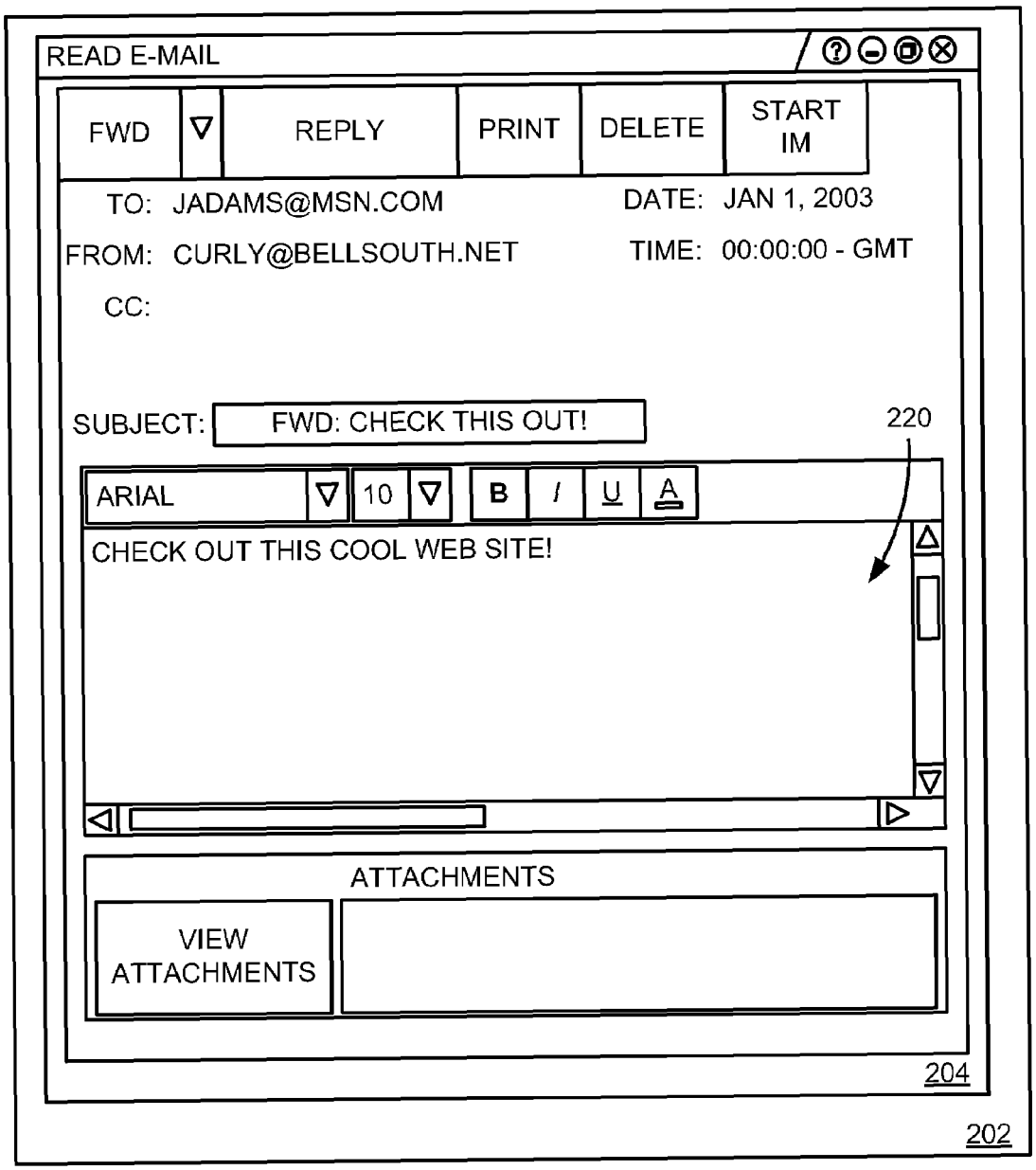
FIG. 2A is a diagram showing a user interface having the forwarded email message without the full header information.

FIG. 2A is a diagram showing a user interface 202 of a recipient's email system (not shown) having the forwarded email message without the full header information. In this regard, the user interface 202 of FIG. 2A shows the forwarded email message with the user-selectable check-box 134 "off" (or not selected) as shown in FIG. 1C. As shown in FIG. 2A, the user interface 202 comprises a read window 204 from which the recipient may read the forwarded email message. Since, as shown in FIG. 1C, the email message was forwarded to the forwardee recipient without the full header information included in the text of the message itself, the read email window 204 displays text of the forwarded email message 220 without the full header information.

Figure 2B:
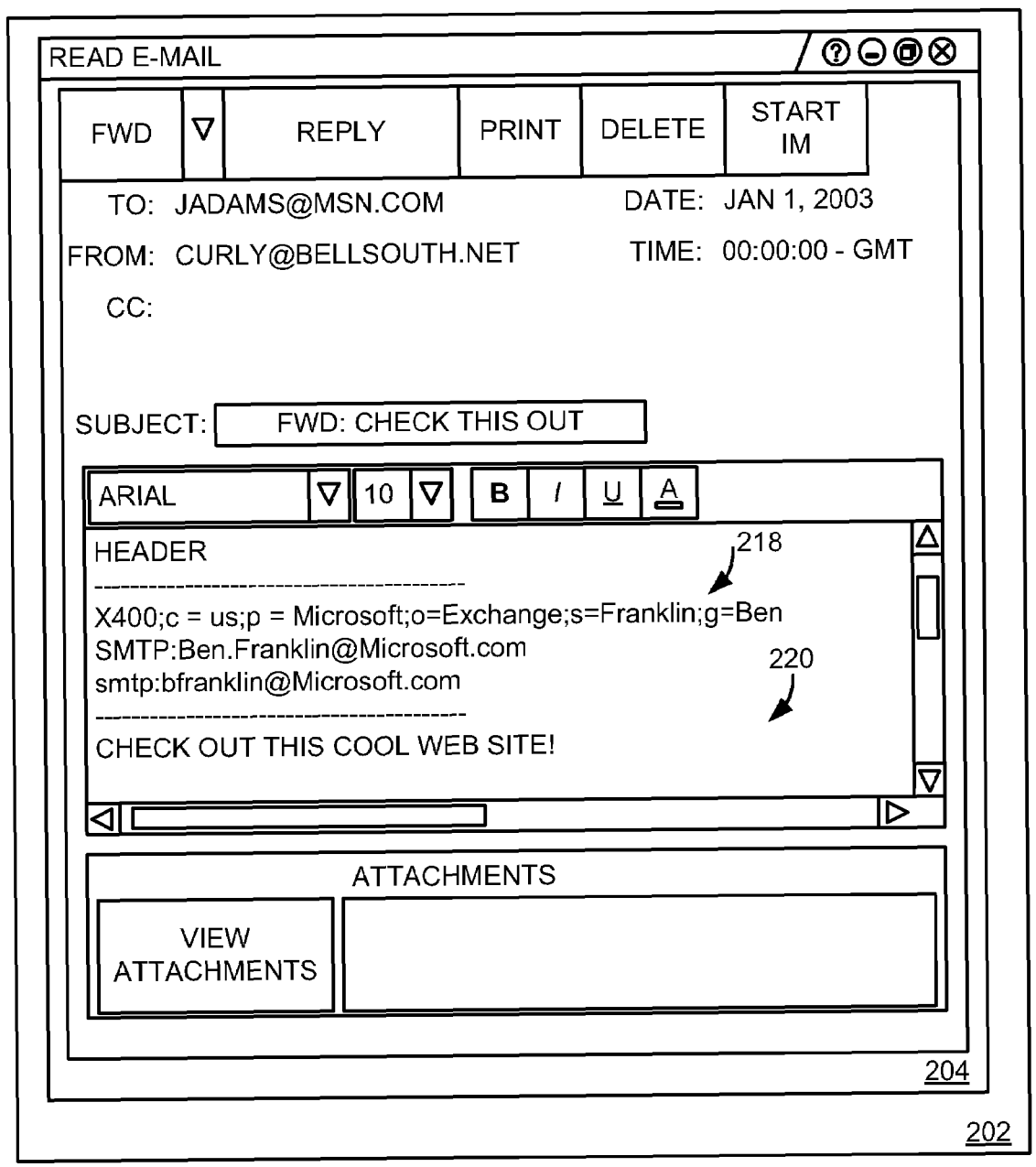
FIG. 2B is a diagram showing a user interface having the forwarded email message with the full header information.

FIG. 2B is a diagram showing a user interface 202 of a recipient's email system (not shown) having the forwarded email message with the full header information. In this regard, the user interface 202 of FIG. 2B shows the forwarded email message with the user-selectable check-box 134 "on" (or selected) as shown in FIG. 1B. As shown in FIG. 2B, the user interface 202 comprises a read window 204 from which the recipient may read the forwarded email message. Since, as shown in FIG. 1B, the email message was forwarded to the forwardee recipient with the full header information, the read email window 204 displays the forwarded email message 220 along with the full header information 218 included in the text of the email message. In another embodiment, the full header information 218 may be attached to the email message as an attachment, rather than being embedded in the email message as text. Regardless of whether the full header information 218 is attached as an attachment or embedded as text, the full header information 218 is available to the forwardee recipient.

It should be noted that, in addition to the full header information of the forwarded email message, the email message received by the forwardee recipient also includes a full header, of which only a truncated portion is shown, that has similar header information (e.g., return path, intermediate hops, date, time, content class, content type, subject, object linking and embedding (OLE) protocols used, multipurpose Internet mail extensions (MIME), date sent, message identifier (ID), attachments, thread topic, thread index, transport neutral encapsulated format (TNEF) information, thread index, sender name, sender email address, reply-to address, content-transfer-encoding information, date received, time received, recipient names, recipient email addresses, attachment type, file name of attachment, etc.).

Thus, as shown in FIGS. 1B through 2B, by having a user-selectable check-box 134 on an email message forwarding screen 104, a user is able to forward the full header information 218 to a forwardee recipient without the inconvenience of manually finding, copying, and pasting (or attaching) the full header information 218. In this regard, any potential errors that may have previously arisen from manually finding, copying, pasting are now obviated.

Figure 3:
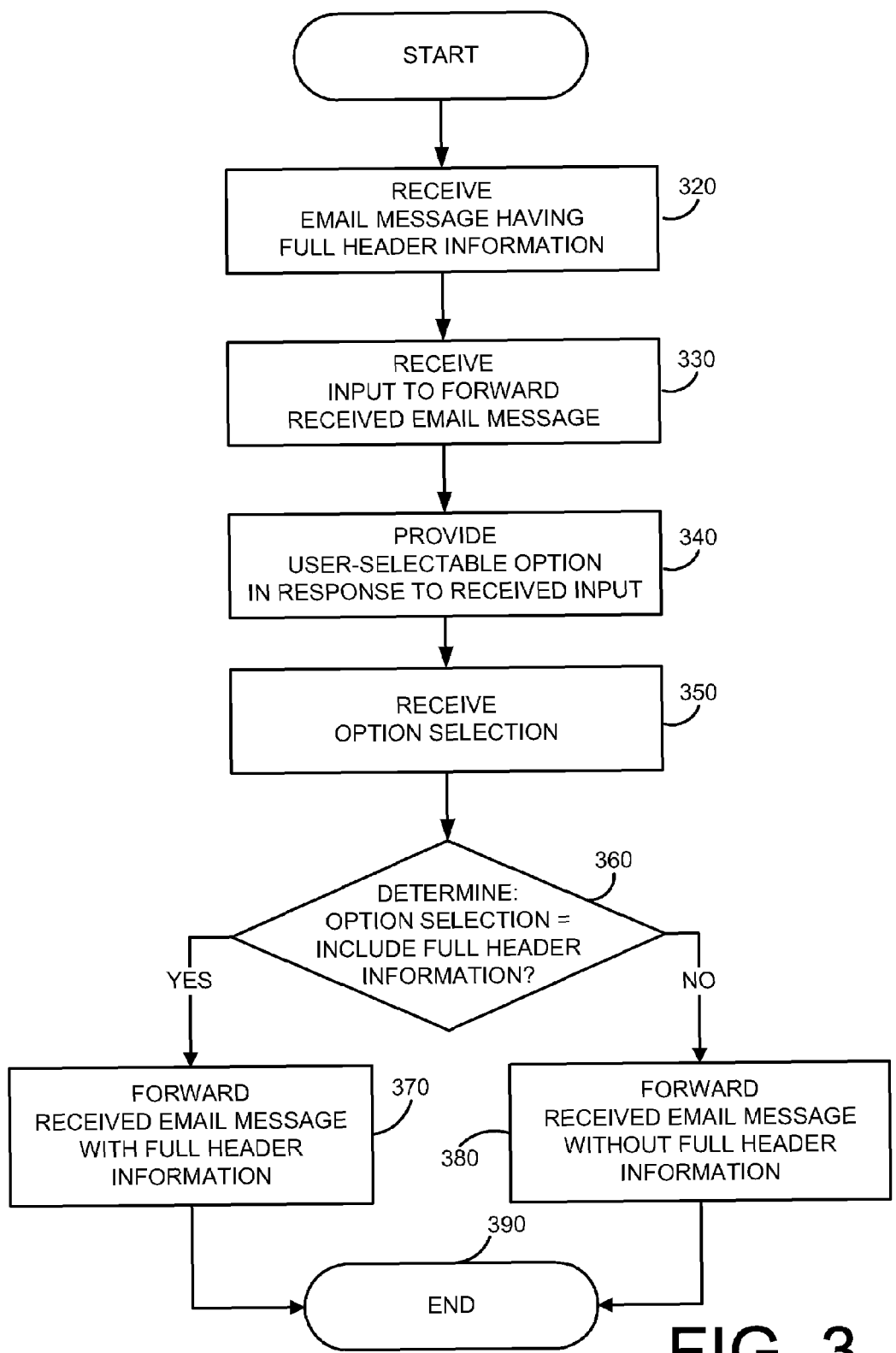
FIG. 3 is a flowchart showing one embodiment of a method for forwarding a received email message with the full header information.

FIG. 3 is a flowchart showing one embodiment of a method for forwarding a received email message with the full header information. As shown in FIG. 3, one embodiment of the method begins when a forwarding user receives (320) an email message having conventional full header information from an original sender. The full header information may or may not be displayed to the forwarding user or the original sender. If the forwarding user chooses to forward the email message, then an input is received (330), which indicates that the user has chosen to forward the received email message. In one embodiment, the input is the selection of a message forward button (not shown) on the forwarding user's email read window (not shown).

Upon receiving (330) the input to forward the received email message, a header-inclusion user-selectable item is provided (340) on an email forwarding screen, such as, for example, the email forwarding screens shown in FIGS. 1B and 1C. In one embodiment, the user-selectable item includes a check-box configured to toggle between a designation to include the full header information and a designation to not include the full header information. In an example embodiment, the check-box may be checked "on" or "off" depending on whether or not the user wishes to include the full header information of the received email message in the forwarded email message.

When the user indicates a selection of either the user-selectable option to include the full header information or not include the full header information, the indication is received (350), and it is determined (360) whether or not the user has indicated the selection to include the full header information of the received email message in the forwarded email message. If it is determined (360) that the user has indicated a selection to include the full header information of the received email message in the forwarded email message, then the received email. message is forwarded (370) with the full header information of the received email message included in the forwarded email message. This may be done by attaching the full header information as an attachment, or by embedding the full header information into the text of the forwarded email message. If it is determined (360) that the user has indicated a selection to not include the full header information of the received email message in the forwarded email message, then the received email message is forwarded (380) without the full header information of the received email message included in the forwarded email message. Thus, in one embodiment, if the user has indicated a selection to not include the full header information of the received email message in the forwarded email message, then the received email message is forwarded with a truncated header, as in conventional email systems.

In another embodiment, the email message with the full header may be automatically forwarded to an email systems administrator or security personnel based on other criteria. For example, if it is determined that a received email message falls under the category of "spam" or an abuse of the email system, then the received email message may be automatically forwarded with the full header to the email systems administrator. Since "spam" and email abuse are known, further discussion of what types of email messages constitute "spam" or an abuse of the email system is omitted here.

This embodiment may be seen as comprising a filtering program (not shown) located at an email server 150, which determines if any incoming email message is either "spam" or an abuse of the email system. The determination may be based on the contents of the email message or other criteria designated by an email systems administrator. If it is determined that the incoming email message is an abuse of the email system, then the email filtering program may forward the email message with the full header directly to the email systems administrator. Similarly, if the email message is determined to be "spam," then the email message may be discarded or deleted by the email filtering program.

As described above, the full header information, which is normally truncated prior to forwarding of email messages, may be included at the option of the user, or, alternatively, may be included based on the contents of an email message or other designated criteria.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The email software, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semitemductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the invention as described may be made. For example, while the user-selectable option in FIGS. 1B and 1C is shown as a check box that may be selected or un-selected by the user, it will be clear to one of ordinary skill in the art that other mechanisms may be employed to provide the user with a user-selectable option to either include or not include the full header of a received email message in a forwarded email message. All such changes, modifications, and alterations should therefore be seen as within the scope of the disclosure.

What is claimed is:

1. In an email messaging system, a method comprising:
   receiving an email message having full header information;
   receiving an input to forward the received email message;
   providing a forward email interface, in response to receiving the input to forward the received email message, the forward email interface automatically removes the full header information from the received email message for sending in a forwarded email message, the forward email interface further facilitates sending the received email message without the full header information as the forward email message; and
   providing a user-selectable option, in the forward email interface, to selectively re-insert the full header information into the forward email message.

2. The method of claim 1, wherein providing the user-selectable option comprises:
   providing a user-selectable item configured to toggle between a designation to include the full header information and a designation to not include the full header information in response to being selected by a user.

3. The method of claim 1, further comprising:
   providing a user-selectable check-box configured to toggle between a designation to include the full header information and a designation to not include the full header information in response to being selected by a user.

4. The method of claim 1, further comprising:
   receiving from the user an indication of a selection to include the full header information of the received email message in the forward email message; and
   forwarding the forward email message with the full header information of the received email message in response to receiving the indication of the selection to include the full header information of the received email message.

5. An email messaging system comprising:
   a user interface on a display having an email message forwarding screen, the email message forwarding screen automatically removes full header information from a received email message for a forward email message; and
   a user-selectable option on the email message forwarding screen, the user-selectable option displays an option to selectively re-insert the full header information of the received email message into the forward email message.

6. The system of claim 5, wherein the user-selectable option is an item being configured to toggle between a designation to include the full header information and a designation to not include the full header information in response to being selected by the user.

7. A computer-readable storage medium comprising:
   computer-readable code adapted to instruct a programmable device to receive an email message having full header information;
   computer-readable code adapted to instruct a programmable device to provide a forward email interface, in response to receiving the input to forward the received email message, the forward email interface configured to automatically remove the full header information from the received email message for sending in a forward email message, the forward email interface further configured to facilitate sending the received email message without the full header information as the forward email message; and
   computer-readable coded adapted to instruct a programmable device to provide a user-selectable option to selectively re-insert the full header information of the received email message into the forward email message.

8. A computer-readable storage medium of claim 7, further comprising:
   computer-readable code adapted to instruct a programmable device to receive from the user an indication of a selection to include the full header information of the received email message in the forward email message; and
   computer-readable code adapted to instruct a programmable device to send the forward email message with the full header information of the received email message in response to receiving the indication of the selection to include the full header information of the received email message.

9. An email messaging system comprising:
   a processor; and
   a storage component configured to store:
   logic adapted to receive an email message having full header information;
   logic adapted to receive an input to forward the received email message;
   logic adapted to provide a forward email interface, in response to receiving the input to forward the received email message, the forward email interface configured to automatically remove the full header information from the received email message for sending in a forward email, the forward email interface further configured to facilitate sending the received email message without the full header information as the forward email; and
   logic adapted to provide a user-selectable option to selectively re-insert the full header information of the received email message into the forward email message.

10. The system of claim 9, further comprising:

logic adapted to receive from the user an indication of a selection to include the full header information of the received email message into the forward email message; and logic adapted to send the forward email message with the full header information of the received email message in response to receiving the indication of the selection to include the full header information of the received email message.

11. An email messaging system comprising:

means for receiving an email message having full header information;

means for receiving an input to forward the received email message;

means for providing a forward email interface, in response to receiving the input to forward the received email message, the forward email interface configured to automatically remove the full header information from the received email message for sending in a forward email, the forward email interface further configured to facilitate sending the received email message without the full header information as the forward email; and means for providing a user-selectable option to selectively re-insert the full header information of the received email message into the forward email message.

12. The system of claim 11, wherein the means for providing user-selectable options comprises:

means for providing a user-selectable item configured to toggle between a designation to include the full header information and a designation to not include the full header information in response to being selected by a user.

13. The system of claim 11, further comprising:

means for receiving from the user an indication of a selection to include the full header information of the received email message into the forward email message; and means for sending the forward email message with the full header information of the received email message in response to receiving the indication of the selection to include the full header information of the received email message.

* * * * *